(No Model.)
T. A. EDISON.
SYSTEM OF ELECTRICAL DISTRIBUTION.
No. 287,517. Patented Oct. 30, 1883.
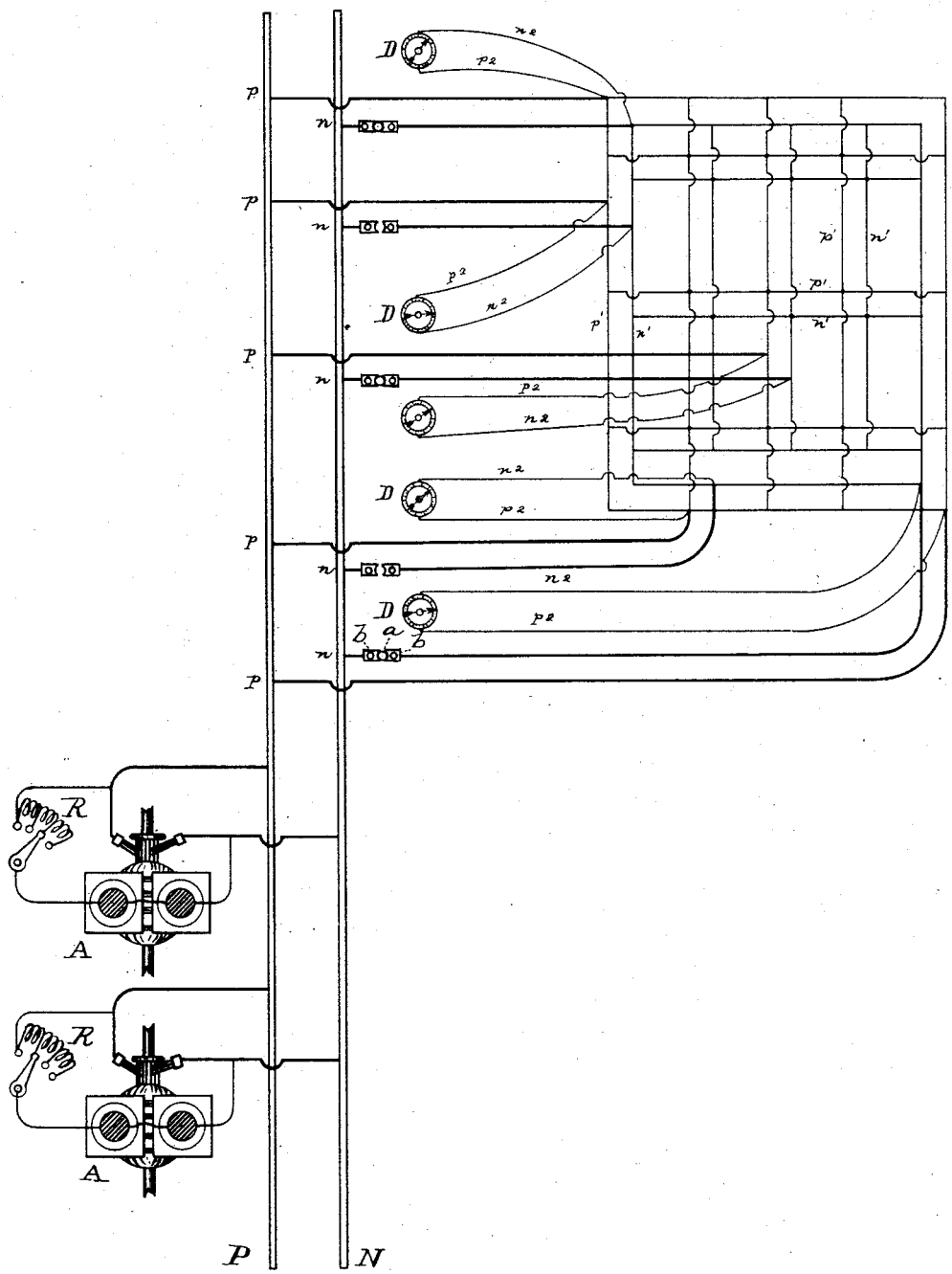

UNITED STATES PATENT OFFICE.

THOMAS A. EDISON, OF MENLO PARK, NEW JERSEY, ASSIGNOR TO THE EDISON ELECTRIC LIGHT COMPANY, OF NEW YORK, N. Y.

SYSTEM OF ELECTRICAL DISTRIBUTION.

SPECIFICATION forming part of Letters Patent No. 287,517, dated October 30, 1883.

Application filed March 16, 1883. (No model.)

*To all whom it may concern:*

Be it known that I, THOMAS A. EDISON, of Menlo Park, in the county of Middlesex and State of New Jersey, have invented a new and useful Improvement in Electrical Distribution Systems, (Case No. 553,) of which the following is a specification.

The object of this invention is to regulate the current supplied to the translating devices of a system of electrical distribution employing feeding-circuits, so as to maintain a constant electro-motive force in the system and furnish a constant current to each translating device in circuit. Such a system consists of one or more generators situated at a central station, from which feeding-circuits containing no translating devices run to different parts of the district supplied, where they are connected to the positive and negative main conductors, these being arranged, as usual in my system, with all the intersecting positive conductors connected together, and likewise all the negative. The translating devices of the system are arranged in multiple arc upon circuits leading from these main conductors. Each feeding-circuit exerts a certain influence over the entire district, such influence being of course greatest at that part of the district contiguous to its terminals, but extending, to some extent at least, to the portions remote therefrom. I have found, therefore, that the current can be regulated and kept constant in all parts of the district simply by connecting and disconnecting the feeders. When the number of translating devices in a certain part of the district decreases to a great extent, the feeder running to this point is disconnected, and the few translating devices still in circuit will be supplied by the remaining feeders; or, when the number of translating devices in a certain part increases, a feeder terminating near such part is connected. Means are provided at the central station for indicating the electro-motive force at the terminals of the feeders. This regulation is used in connection with the regulation of the generators by the adjustable resistances in their field-circuits, or by other suitable means, which regulate for changes in the entire number of translating devices in circuit.

The accompanying drawing is a diagram of a system of electrical distribution provided with means for carrying out my invention.

A A are dynamo-electric machines, each having its field and its armature connected in multiple arc with the conductors P N, which are situated within the central station. The feeding-circuits $p\ n$ are connected in multiple arc with these conductors, and extend to various points of the district, where they are connected to the intersecting positive and negative main conductors $p'\ n'$, which supply the translating devices. Each feeding-circuit is provided with a suitable circuit-controller. A convenient form is a metal plug, $a$, inserted between two metal plates, $b\ b$, to close the circuit, and withdrawn to break the circuit. If the number of translating devices in any part of the district increases to such an extent that the current supplied is insufficient for them, the feeding-circuits leading nearest to such point would be plugged in, and the feeding-circuits would be broken, as less current is required at the points contiguous to their terminals. To indicate the electrical condition at the terminals of the feeders, the auxiliary circuits $p^2\ n^2$, of small wire, are run back to the central station, where each is connected with an electro-dynamometer, D, and the regulation is performed in accordance with the indications of these instruments.

The adjustable resistances R R in the field-circuits of the generators are used to increase and decrease the currents supplied through all the feeders to the entire district.

It is evident that this method of regulation could be readily applied to my "compensating" system in cases where feeding-circuits are employed in such a system.

What I claim is—

1. The method of regulating the supply of current in a system of electrical distribution, comprising a system of positive and negative main conductors and feeding-circuits, connecting the source of supply with said main conductors, consisting in breaking and closing the feeding-circuits, according to the current required in the parts of the system contiguous to their terminals, substantially as set forth.

2. In a system of electrical distribution, the combination of the intersecting and properly-connected positive and negative main conductors, and the feeding-circuits extending from the source of supply to said main conductors, each of said feeding-circuits being provided with a circuit-breaker, substantially as set forth.

3. In a system of electrical distribution of the character described, the combination, with the feeding-circuits, each provided with a circuit-controller, of means for regulating the current generated at the source of supply, substantially as set forth.

4. In a system of electrical distribution of the character described, the combination, with the feeding-circuits, each provided with a circuit-controller, and means for constantly indicating the electrical condition at the terminals of said feeding-circuits, of means for regulating the current generated at the source of supply, substantially as set forth.

This specification signed and witnessed this 14th day of March, 1883.

THOS. A. EDISON.

Witnesses:
WM. H. MEADOWCROFT,
H. W. SEELY.